Sept. 22, 1953 E. SHIPTON 2,653,192

TELEPHONE APPARATUS

Filed Jan. 7, 1949 3 Sheets-Sheet 1

Inventor

Edward Shipton

By Emery, Holcombe & Blair

Attorneys

Sept. 22, 1953 E. SHIPTON 2,653,192

TELEPHONE APPARATUS

Filed Jan. 7, 1949 3 Sheets-Sheet 2

Inventor

Edward Shipton

By Emery, Holcombe & Blair

Attorneys

Inventor
Edward Shipton
By Emery, Holcombe & Blair
Attorneys

UNITED STATES PATENT OFFICE 2,653,192

TELEPHONE APPARATUS

Edward Shipton, Ferndown, Northwood Hills, England

Application January 7, 1949, Serial No. 69,799
In Great Britain January 10, 1948

14 Claims. (Cl. 179—103)

Telephone instruments are generally constructed in the form of a handset incorporating both the microphone and receiver (sound reproducing) units, the handset normally resting, when not in use, on a cradle of a base part which incorporates other equipment of the telephone system and sometimes the bell or other calling signal. The handset is generally constructed with a handle portion of moulded material having hollow chambers at each end for accommodating the microphone and receiver units, the latter being held in place by a removable mouthpiece and earpiece respectively.

The present invention has for an object to provide an improved construction of telephone handset whereby it may be made more decorative or pleasing to the eye than the conventional handset. A further object is to provide a simplified construction of handset. Another object is to provide a handset which avoids the necessity of the usual base part and cradle for supporting the handset when not in use. A still further object is to provide a handset which also incorporates the audible calling signal and also the switching means for calling another station.

According to one aspect the invention consists in a telephone handset comprising a casing in the form of a hollow box which is open on one side which side is adapted to be fitted with a cover plate, both the microphone unit and receiver unit being positioned within the casing and located adjacent apertures in the cover plate through which the sounds may pass to or from the microphone and receiver units respectively. Preferably a single cover plate is used although the cover plate could be constructed of two or more sections. The casing, which may conveniently be made of a moulding of synthetic resin material, is preferably provided with recesses or compartments adapted to accommodate the microphone and receiver units in their correct relative positions, which units are held in the casing by securing the cover plate in position. The cover plate or plates preferably fit within the sides of the casing so as to lie substantially flush with the open edge thereof. The cover plate may be secured by screws which screw into a rebate around the inner edge of the casing or into spacing or support members or partitions moulded within the casing, or it may be secured by being sprung into an undercut around the rebate.

From another aspect the invention consists in a telephone handset in which the microphone and receiver units are enclosed in a casing consisting only of two parts which, when fitted together, form a box-like structure, the microphone and receiver units being held in their desired relative positions by placing them within the casing parts and securing the two parts together, one or both casing parts being provided with an aperture or apertures for allowing the sounds to pass to and from the microphone and receiver units respectively when located within the casing. Preferably one part of the casing is of hollow box-like form which is provided internally with partitions or chambers for locating the microphone and receiver units, the second part constituting a simple cover plate which, when secured to the first part, holds the microphone and receiver units in their respective compartments. Conveniently both parts of the casing are moulded of a synthetic resin material, and preferably of a synthetic resin material which is resilient, such as polythene or cellulose acetate.

When not in use the handset is intended to be rested upon the surface of a table or the like with the cover plate directed downwardly or may be supported on a wall hook or fitting with the cover plate directed towards the wall. The exposed surfaces of the back and sides of the casing may be provided with any desired ornamentation or decoration.

Since the telephone handset normally rests with the cover plate adjacent a flat surface, such as a table or wall, the cover plate is conveniently made of flat form although, particularly for the reasons hereinafter described, it may be made of curved form or provided with feet or projecting members so that it may be slightly spaced from the surface against which it is placed when not in use. If desired the cover plate may also be moulded with annular or part-annular ridges around the aperture or apertures defining the earpiece and mouthpiece on the cover plate.

The construction of the handset according to this invention is very simple since it consists essentially only of a box-like casing and a single cover plate and the necessary microphone and receiver units enclosed therein. Furthermore the mouldings for the casing and cover plate are relatively simple to produce and do not involve employing complicated moulding dies.

The telephone handset according to this invention is preferably used without a supporting cradle, the call to another station being effected by actuating a switch, preferably in the form of a press button or the like, arranged on the side or at any other convenient point of the handset. This switch, when closed, may complete a D. C. loop through the apparatus at the called station to actuate a calling signal thereat, and to complete the talking circuit when the called station answers.

A feature of the invention consists in incorporating an audible calling signal in the telephone handset, which is operated when the subscriber is being called. A buzzer or the like may be provided for this purpose, or the calling signal may be produced by creating a "howl"

in the telephone receiver. This can be effected by feeding an alternating ringing current having a frequency within the audible range through the subscriber's lines, the switch on the handset, which is actuated to complete the D. C. loop when making a call or speaking, being bridged by a condenser so that the audible oscillations are fed through the condenser and receiver in series and cause the latter to emit an audible calling signal.

From another aspect, therefore, the invention consists in a telephone handset which incorporates a microphone, a receiver, a condenser, and a switch, the condenser and receiver being connected in series across the line terminals and the switch being shunted across the condenser so as to short-circuit the latter when the switch contacts are closed. Preferably the switch is of the normally open type, for example being provided with spring actuated contacts actuated by a push button or the like. The microphone may either be connected in series with the receiver and condenser, or may alternatively be connected in series with the switch shunted across the condenser, the closing of the switch thereby also connecting the microphone in the talking circuit.

To enable the calling signal or "howl" to be clearly audible, the handset is preferably so constructed that the apertures opposite the receiver are spaced from the surface against which the handset lies or is positioned when not in use. This may be effected by providing the cover plate with small feet or projections which keep the underside of the handset spaced from the surface upon which it lies. For example, if an annular ridge is provided on the cover plate around the apertures defining the receiver portion of the handset, this ridge may be notched or apertured to allow the sounds produced by the calling signal to pass therethrough. Alternatively part-annular ridges may be provided, or the cover plate, with if necessary the casing may be curved from end to end so that the central portion thereof is raised from the surface. This form also has the advantage that it positions the mouthpiece orifices more in front of the user's mouth when the telephone is in use.

Alternatively one or more apertures may be provided in the side wall or walls or the back of the casing part of the handset through which the calling signal may be heard.

The casing and cover plate of the handset are preferably moulded of a substantially unbreakable synthetic resin material, such as polythene. This material also possesses a degree of flexibility which enables, if desired, the switch to be entirely enclosed within the casing, the flexing of a wall thereof by pressure thereon causing the switch to be actuated. A further feature of the invention therefore consists in a telephone handset having an enclosed casing moulded, at least in part, of a flexible material and incorporating a switch which may be actuated by pressure upon the flexible portion of the casing.

A further feature of the invention consists in a modified arrangement whereby a station may selectively call any one of a plurality of other stations without a central switchboard being necessary, thus enabling the telephone instrument to be adapted for intercommunicating systems comprising more than two stations. For this purpose, the push-button or other switch on the telephone instrument only completes the talking circuit, the selection of the station to be called being effected by actuating one of a plurality of push-button or other switches disposed on a switchbox which is separate from the telephone instrument.

According to a feature of the invention the switchbox is adapted to be fixed to a wall or like surface and is provided with a hook or equivalent means whereby the telephone instrument can be supported from the switchbox.

In order that the invention may be more clearly understood, reference will now be made to the accompanying drawing, in which.

Figure 1:
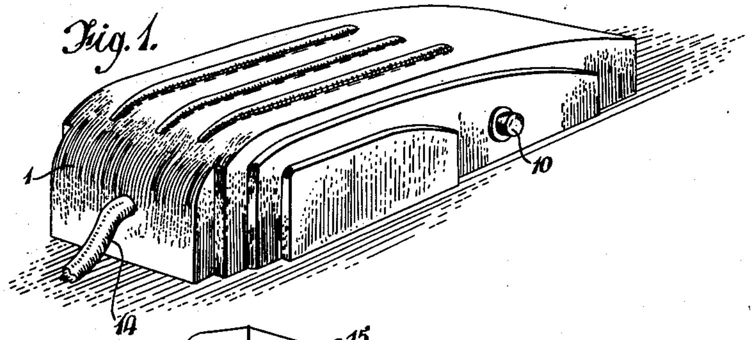
Fig. 1 shows a perspective view of a handset, according to the invention, resting on a flat surface.
Figure 3:
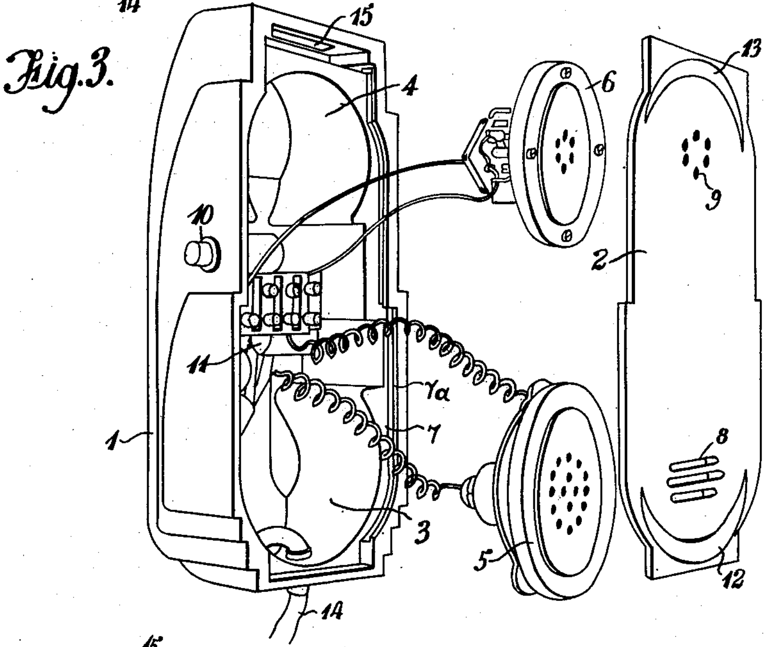
Fig. 3 shows an exploded perspective view.
Figure 2:
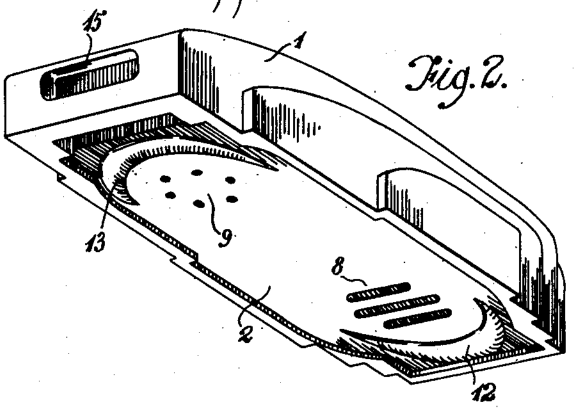
Fig. 2 shows a perspective view of the handset from below.

Referring to Figs. 1, 2 and 3, the handset comprises a box-like casing 1, preferably moulded of polythene, which is open on its underside and closed by a cover plate 2, also preferably moulded of polythene, which is fitted within a rabbet 7 formed around the inner surface of the open edge of the casing 1, the rebate being formed with an undercut 7*a* into which the edges of the cover plate 2 fit to hold the cover in position. Due to the resilient nature of polythene, the lip of the undercut and the sides of the casing will flex to permit the cover plate to be sprung into position. The casing 1 is internally moulded to form chambers 3 and 4 for accommodating the microphone unit 5 and receiver unit 6 respectively, both of which are retained in their respective chambers when the cover plate is secured, over the openside of the casing 1. The cover plate 2 is provided with two sets of apertures 8 and 9 which lie opposite the microphone and receiver units respectively when the cover plate is secured in position.

The cover plate is also provided with part-annular ridges 12 and 13 which partly surround the sets of apertures 8 and 9 respectively, thus forming projections so that a space is produced beneath the cover plate when the handset is resting on a table surface through which the calling "howl" produced in the receiver or the sound produced by a buzzer or the like in the handset, may be heard.

The handset also carries a push button switch 10 on its side for completing the calling and/or talking circuits. In the embodiment now being described, this switch, when depressed, is adapted to short-circuit a condenser 11 secured within the handset. This condenser is connected in series with the receiver and allows an audible frequency calling signal to actuate the receiver when the push button is open. When the push button 10 is depressed it short-circuits the condenser 11 to complete a D. C. loop through the microphone 5 and receiver 6 in series.

Figures 7, 8, 9:
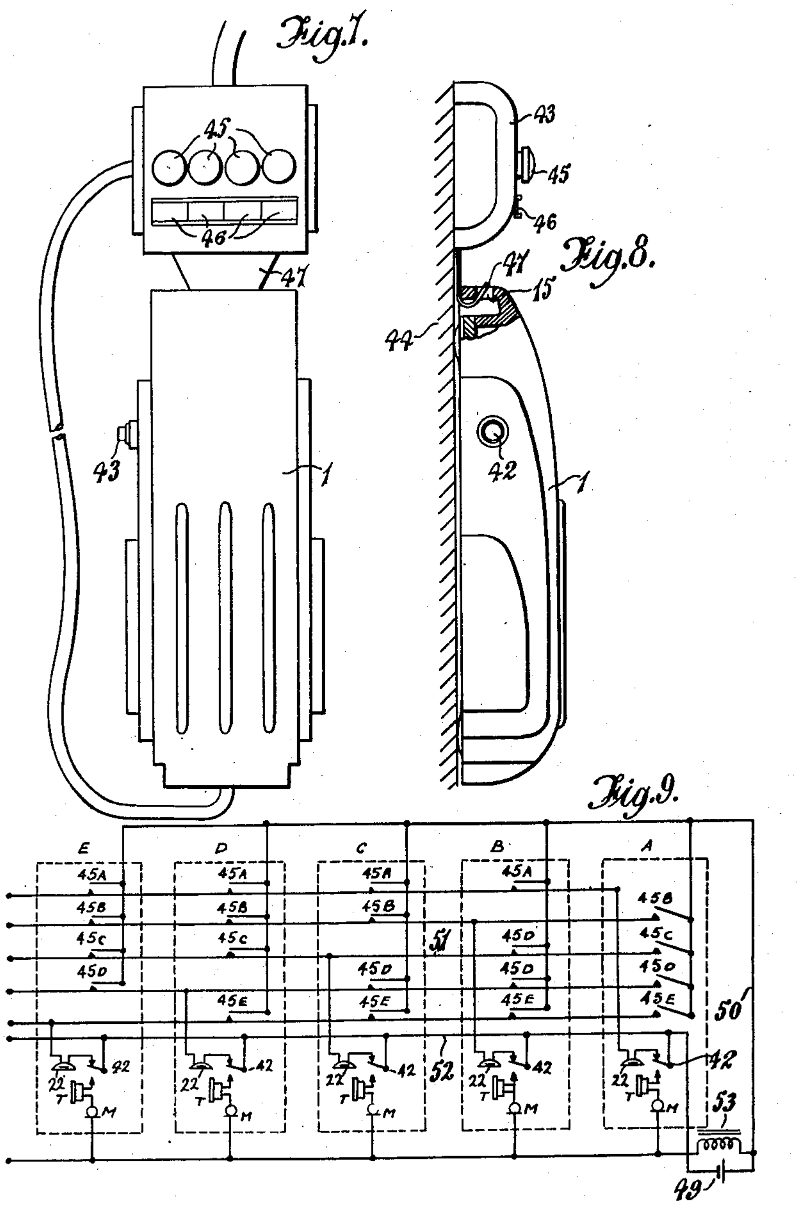
Fig. 7 shows a front view of the handset supported from a wall-fitting switchbox for selectively calling one of a plurality of stations of an intercommunicating telephone system.
Fig. 8 shows a side view of Fig. 7, partly in section.
Fig. 9 shows a circuit diagram of an intercommunicating telephone system incorporating the apparatus shown in Figs. 7 and 8.

The telephone cord 14 passes through an aperture in one end of the casing 1, and the other end of the casing 1 is provided with a rectangular aperture 15 for enabling the handset to be hung from a wall hook. A space is left between this end of the casing and the corresponding end of the cover plate 2 to allow the hook to be inserted as shown in Fig. 8.

Figures 4, 5, 6:
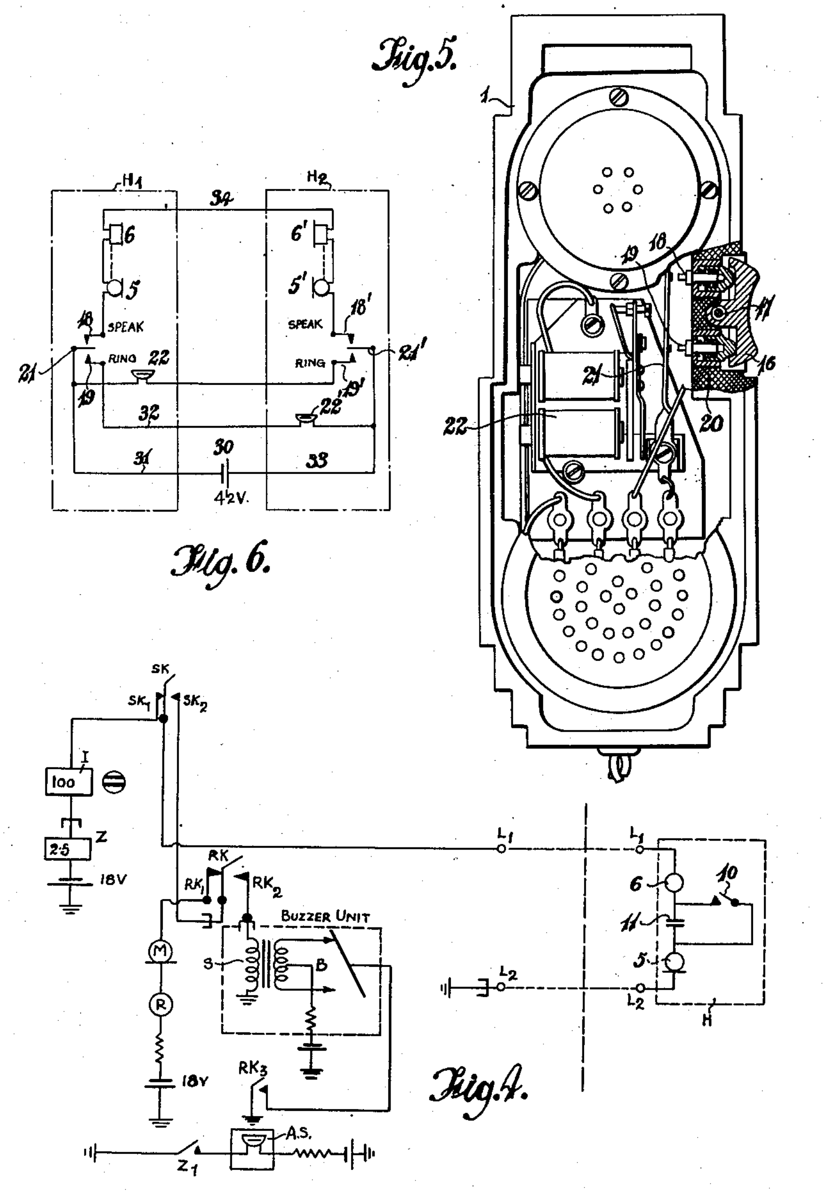
Fig. 4 shows a circuit diagram of a telephone system.
Fig. 5 shows an underside view, with the cover removed, of a modified handset.
Fig. 6 shows a circuit diagram for a two-station system employing the handset of Fig. 5.

The handset according to the present invention is particularly suitable for use in so-called intercommunicating telephone systems. One such system, in which a plurality of sub-stations can call and speak to a master station, is illustrated in Fig. 4.

In this system the apparatus at the sub-stations merely comprises a telephone handset as described, which is diagrammatically represented by the rectangle H. The telephone handset at each sub-station is connected through a common line L2 to earth, the other line L1 connecting to an individual speaking key SK at the central station. In its normal position, this key completes the line circuit through contact SK1, an indicator relay I, and thence through a relay Z, which is common to all the calling circuits, and through the battery to earth.

For the sub-station to make a call he depresses his push button 10 which completes a D. C. circuit through the microphone 5 and receiver 6 of the handset 4, switch contact SK1, indicator relay I, and relay Z. Indicator I actuates a visible signal to indicate the calling station and relay Z closes its contact Z1 to energise the audible calling signal AS, such as a bell or buzzer, at the central station.

To receive the call the central station throws key SK corresponding to the indicated calling station, which completes the line circuit through contact SK2, contact RK1 of the ringing key RK, and the microphone M and receiver R at the central station, to battery. The sub-station operator maintains his switch 10 depressed whilst speaking.

When the call is completed the sub-station operator releases switch 10 and the central operator restores switch SK to its normal position.

If the central operator desires to call a sub-station he throws his switch SK corresponding to the station to be called and then actuates his ringing key RK, which is common to all lines, to close contacts RK2 and RK3. RK3 completes a circuit through a polarised buzzer B producing a high pitch tone. The buzzer winding constitutes the primary winding of a transformer, the secondary S of which is connected through contact RK2, contact SK2 of the switch corresponding to the station being called, line L1, receiver 6, condenser 11, microphone unit 5, line L2, to earth. The audible tone injected into this circuit through the buzzer transformer produces a "howl" in the receiver 6 at the called station. Upon releasing the ringing key RK, it returns normally to its contact RK1 thus opening the contacts RK2 and RK3 to stop the buzzer. The called sub-station answers by depressing his push button 10 which completes the talking circuit as above described.

Figure 5 shows an underside view, with the cover removed, of a modified handset in which a rocker 16 is provided in the side wall of the casing 1 and is rocked in one direction to complete a ringing circuit and in the other direction to complete the talking circuit. The rocker 16 is pivoted at 17 in a member 20 supported from the internal surface of the casing 1, and is held in its neutral position by two spring-pressed plungers 18, 19 respectively carried in apertures in the member 20. The ends of these two plungers project beyond the back of the member 20 and, when depressed, engage with a spring contact 21 to complete either the ringing or talking circuit. In this modification the condenser 11 is omitted and the calling signal is produced by a buzzer 22 mounted within the casing 1.

The circuit of a two-station system employing handsets as illustrated in Figure 5 is shown in Figure 6, in which the two handsets are indicated diagrammatically by the rectangles H1, H2. For H1 to make a call to H2 he depresses his rocker 16 to move the plunger 19 into engagement with the spring contact 21, whereby a circuit is completed from the battery 30, through line 31, contacts 21 and 19 which are closed, line 32, buzzer 22′ in handset H2, conductor 33, to battery 30. Buzzer 22′ thus sounds to call H2. H1 then swings his rocker to its position to complete the talking circuit between contacts 18 and 21 and open the calling circuit. H2 answers the call by actuating his rocker to close his contacts 18′ and 21′, the talking circuit being completed from battery 30, through line 31, contacts 21 and 18, microphone 5 and receiver 6 of handset H1, line 34, receiver 6′ and microphone 5′ of handset K2, contacts 18′ and 21′, line 33 to battery 30. When the call is completed the rockers 16 at both stations H1 and H2 return to their neutral positions upon release, and the apparatus is ready for either station H1 or H2 again to make a call.

Referring now to Figs. 7 and 8 of the drawings, 1 is the telephone instrument of the type above described which is provided with a push button switch 42 for completing the talking circuit. The instrument incorporates a buzzer 22 as shown in Fig. 5. 43 is the switchbox which is adapted to be secured to the wall surface 44 and comprises a plurality of push button switches 45 (in the example four push buttons are shown) for selectively actuating calling circuits to other stations. The front of the switchbox also carries name tabs 46. Downwardly depending from the switchbox is a hook 47 the end of which is adapted to fit into the aperture 15 in the telephone instrument whereby the instrument may be suspended from the switchbox when not in use.

Fig. 9 shows a circuit diagram of a telephone system incorporating the apparatus shown in Figs. 7 and 8 and comprising five stations. The equipment at each station is shown enclosed within the dotted areas A, B, C, D, E respectively and each comprises the microphone M, telephone receiver T, buzzer 22 and the push button switch 42, all incorporated in the telephone instrument 1, and the four push button switches 45 incorporated in the switch box 43. For any station to call another station he depresses the appropriate push button calling switch 45. To be ready for receiving the reply he also depresses his talking switch 42. The called station merely lifts his telephone instrument and depresses his talking switch 42 to complete the talking circuit.

Thus, for example, if station A desires to call station C he depresses his calling switch 45C which completes a calling circuit from the positive pole of battery 49, conductor 50, switch 45C, conductor 51, buzzer 22 at station C, through the talking switch 42 at this station and conductor 52 to the negative pole of the battery 49. In answering the call station 6 depresses his talking switch 42 which opens the circuit through his buzzer 22 and completes the talking circuit across the battery 49 and choke 53 as shown in the diagram. Station A also depresses his talking switch 42 to complete his talking circuit across the battery 49 and choke 53.

Whilst particular embodiments according to the invention have been described, it will be understood that various modifications may be made without departing from the scope of the invention. Thus the switchbox need not form a support for the telephone instrument but could be quite separate therefrom, simply being laid, for example on a desk or table, or secured in any other convenient position.

I claim:

1. A telephone hand-set, comprising an elongated hollow housing having an oblong external cross-section and being open and substantially flat at one side substantially parallel to the maximum diameter of said cross-section, a telephone receiver having a sound emitting means and a microphone lodged within the housing adjacent the two ends thereof respectively, the housing being formed internally with projecting portions engaging said receiver and microphone to locate them against movement parallel to the open side of the housing and substantially sheet-like cover means substantially closing the open side of the housing to form with said housing an enclosure for said receiver and microphone and holding said receiver and microphone against movement perpendicularly of the cover means, said enclosure being apertured adjacent said microphone and adjacent said receiver to permit sound to pass from the outside of the enclosure to said microphone and from said receiver to the outside of the enclosure.

2. A telephone hand-set as claimed in claim 1 further comprising a sound generator unit positioned in said casing between said microphone and receiver, a manually operable switch device carried by said casing, said switch device having a working position in which when the set is connected to a telephone line, the normal speaking circuit including the telephone and microphone is established, and a rest position, in which the sound-generator unit is in circuit with the line, but the normal speaking circuit is interrupted.

3. A telephone hand-set, comprising an elongated hollow housing, moulded of resilient synthetic resin, said housing having an oblong, substantially rectangular external cross-section and being substantially flat at the two shorter sides, and open and substantially flat at one of the longer sides of said cross-section, a telephone receiver, having a sound emitting means and a microphone having a sound receiving means, lodged within the housing adjacent the two ends thereof respectively with said sound emitting and receiving means facing the open side of the housing, the housing being formed internally with projecting portions engaging said receiver and microphone to locate them against movement parallel to the open side of the housing, a rabbet and an undercut recess adjacent said rabbet formed in the housing adjacent the open edges thereof, a flexible, substantially sheet-like cover of resilient synthetic resin lodged in said recess and substantially closing the open side of the housing, said receiver and microphone being held by said cover against movement perpendicularly thereof, said cover having apertures substantially facing said sound emitting means and apertures substantially facing said sound receiving means, the hand-set being further provided with means for supporting the same on a flat surface with the open side of the housing facing, and being spaced from, said surface.

4. A telephone hand-set, comprising an elongated hollow housing, moulded of polythene synthetic resin, said housing having an oblong, substantially rectangular external cross-section and being substantially flat at the two shorter sides, and flat and open at one of the longer sides of said cross-section, a telephone receiver, having a sound emitting means and a microphone having a sound receiving means, lodged within the housing adjacent the two ends thereof respectively with said sound emitting and receiving means facing the open side of the housing, the housing being formed internally with projecting portions engaging said receiver and microphone to locate them against movement parallel to the open side of the housing, a rabbet and an undercut recess adjacent said rabbet formed in the housing adjacent the open edges thereof, a flexible substantially sheet-like cover of polythene synthetic resin lodged in said recess and substantially closing the open side of the housing, said receiver and microphone being held by said cover against movement perpendicularly thereof, said cover having apertures substantially facing said sound emitting means, apertures substantially facing said sound receiving means, projecting portions extending from its outer surface for supporting the hand-set on a flat surface with its outer surface facing, and being spaced from, said flat supporting surface.

5. A telephone hand-set, comprising an elongated hollow housing, moulded of synthetic resin, said housing having an oblong, external cross-section and being open and substantially flat at one side substantially parallel to the maximum diameter of said cross-section, a telephone receiver, having a sound emitting means and a microphone having a sound receiving means, lodged within the housing adjacent the two ends thereof respectively with said sound emitting and receiving means facing the open side of the housing, the housing being formed internally with projecting portions engaging said receiver and microphone to locate them against movement parallel to the open side of the housing, and a substantially sheet-like cover of synthetic resin substantially closing the open side of the housing, said receiver and microphone being held by said cover against movement perpendicularly thereof, said cover having apertures substantially facing said sound emitting means and apertures substantially facing said sound receiving means, one end wall of the housing being formed with an aperture for receiving suspension means, and the cover being so shaped as to leave part of said open side of the housing uncovered for access to said aperture.

6. A telephone hand-set, comprising an elongated hollow housing having an oblong substantially rectangular external cross-section and being substantially flat at one side extending longitudinally of the housing and of said cross-section, and being constituted of two separate parts joined along a line extending longitudinally of the housing and of said oblong cross-section thereof, and having a cavity substantially coextensive with the housing, a telephone receiver and a microphone in said cavity adjacent the two ends thereof respectively, locating means in the two parts of the housing for locating said receiver and microphone within said cavity when the two parts are joined but allowing said receiver and microphone to be lifted out when the parts are separate, and auxiliary apparatus in said cavity intermediate said telephone and microphone, said auxiliary apparatus comprising a buzzer-type sound generator unit.

7. A telephone hand-set comprising an elongated hollow box having an opening at one side and wall surfaces enclosing said opening, inwardly facing shoulder means on said wall surfaces, a substantially flat lid having edge portions substantially abutting said wall surfaces for locating the lid relative thereto, and a telephone receiver and a microphone placed inside said box and retained in position by being confined between said lid and part of the interior surface of said box, said lid further having edge portions extending under said shoulder means to retain the lid in said box.

8. A telephone hand-set comprising an elongated member moulded of plastic material and substantially flat at one side, said member being formed with a cavity open at and having side wall surfaces extending to said flat side so that the cavity is open at said side, a telephone receiver and a microphone arranged side by side in said cavity, the cavity adjacent said receiver and adjacent said microphone being formed with locating means for preventing said receiver and microphone, when inserted into the cavity from said side, from movement along said flat side, a substantially flat lid of resilient plastic material, by which the open side of said cavity is closed and by which said receiver and microphone are retained in said cavity, grooves being formed in said side wall surface adjacent to and substantially parallel with said flat side, and the lid being sprung into said grooves and being retained thereby in position.

9. A telephone hand-set comprising an elongated housing having a number of longitudinally extending surfaces, a telephone receiver, a microphone and a buzzer-type sound generator mounted in said housing, openings in one of said longitudinal surfaces for permitting the passage of sound to and from said microphone and receiver respectively, a rocker lever projecting through another of said longitudinal surfaces, said other surface extending approximately perpendicularly to said one surface, four line wire terminals, and switch means selectively operable by said rocker lever from its normal open position into one or other of two circuit-closing positions for selectively establishing either a first circuit comprising electrical connection between two of said terminals, or a second circuit comprising a connection from one of the two said terminals through the telephone receiver and serially therewith through the microphone to the third line wire terminal, the fourth terminal being connected with the first terminal through the sound generator, at least when said switch is in its normal open position.

10. A telephone hand-set comprising an elongated housing of resilient plastic material having a cavity forming an opening at one side of the housing and two seatings, a telephone receiver and a microphone mounted in said seatings, a cover plate guided in and substantially closing said aperture and retaining said receiver and microphone in their seatings, and a rabbet arranged at the edge of said aperture and overhanging said cover plate, the width of said rabbet being so small as to permit the cover plate to be inserted by resilient deformation of at least one of said housing and cover plate.

11. A telephone hand-set comprising an elongated housing, a telephone receiver and a microphone mounted in the housing adjacent opposite ends thereof, a plurality of terminal connectors, a switch having a normal position and a speaking position and including a contact closed in the speaking position and open in the normal position, conductor means for establishing a speaking connection between two said terminal connectors in series through the telephone receiver and microphone and said contact, and electrical operable sound emitting means in the housing, said means being electrically interconnected between two said terminals, at least in the normal position of said switch.

12. A telephone hand-set as claimed in claim 11, including a condenser connected in parallel with said contact of the switch, said sound emitting means being constituted by the telephone receiver in series with said microphone and condenser.

13. A telephone hand-set comprising an elongated casing, a telephone receiver and a microphone mounted in said casing adjacent the two ends thereof, a buzzer-type sound generator and a plurality of terminals also mounted in said casing and a spring-biased switch so mounted in the casing as to be operable by pressure of a person's hand clasping the housing from the normal position to which it is spring-biased to a further position, said switch having a contact which is open in the normal position and closed in the further position of the switch, and conductor means for establishing at least in the normal position of the switch, a connection from one to another of said terminals through the sound generator and further conductor means for establishing a connection from one to another of said terminals in series through the telephone receiver, the microphone and said contact of the switch.

14. A telephone hand-set as claimed in claim 1, including auxiliary apparatus in said cavity intermediate said receiver and microphone, said auxiliary apparatus including a condenser connected in series with said receiver and microphone and a switch operable to short-circuit said condenser, said housing having at least one aperture adjacent said switch, and said switch having actuating means extending through such aperture.

EDWARD SHIPTON.

References Cited in the file of this patent

UNITED STATES PATENTS

| Number | Name | Date |
|---|---|---|
| 1,181,947 | Cadieux | May 2, 1916 |
| 1,432,623 | Riley | Oct. 17, 1922 |
| 2,079,089 | Varley | May 4, 1937 |
| 2,109,761 | Warnke | Mar. 1, 1938 |
| 2,131,593 | Marshall | Sept. 27, 1938 |
| 2,214,992 | Chevassus | Sept. 17, 1940 |
| 2,224,698 | Roseby | Dec. 10, 1940 |
| 2,433,295 | Riebe | Dec. 23, 1947 |
| 2,490,637 | Kraepelien | Dec. 6, 1949 |
| 2,497,336 | Young | Feb. 14, 1950 |
| 2,506,715 | Ffolliott | May 9, 1950 |

FOREIGN PATENTS

| Number | Country | Date |
|---|---|---|
| 732,906 | France | Sept. 28, 1932 |